(12) United States Patent
Lin et al.

(10) Patent No.: US 12,180,359 B1
(45) Date of Patent: Dec. 31, 2024

(54) ELECTRICALLY CONDUCTIVE HYDROGEL COMPOSITION, SELF HEALING ELECTRICALLY CONDUCTIVE HYDROGEL PREPARED THEREFROM, AND HYDROGEL-BASED TRIBOELECTRIC NANOGENERATOR

(71) Applicant: Ming Chi University of Technology, New Taipei (TW)

(72) Inventors: Meng-Fang Lin, New Taipei (TW); Feng-Xiang Yeh, New Taipei (TW); Jun-Jie Zhang, New Taipei (TW); Priyanka Chaudhary, New Taipei (TW)

(73) Assignee: Ming Chi University of Technology, New Taipei (TW)

( * ) Notice: Subject to any disclaimer, the term of this patent is extended or adjusted under 35 U.S.C. 154(b) by 0 days.

(21) Appl. No.: 18/479,442

(22) Filed: Oct. 2, 2023

(30) Foreign Application Priority Data

Jul. 20, 2023 (TW) ................................ 112127169

(51) Int. Cl.
*H01B 1/24* (2006.01)
*C08L 29/04* (2006.01)

(52) U.S. Cl.
CPC ................ *C08L 29/04* (2013.01); *H01B 1/24* (2013.01); *C08L 2203/20* (2013.01)

(58) Field of Classification Search
CPC ............................ C08L 29/04; C08L 2203/20
See application file for complete search history.

(56) References Cited

FOREIGN PATENT DOCUMENTS

| CN | 110970232 A | 4/2020 | |
|---|---|---|---|
| CN | 111744023 A | 10/2020 | |
| WO | WO 2020047674 A1 | * 12/2020 | ............ H01M 10/05 |

OTHER PUBLICATIONS

Search Report appended to an Office Action, which was issued to Taiwanese counterpart application No. 112127169 by the TIPO on Dec. 18, 2023, with an English translation thereof.

* cited by examiner

*Primary Examiner* — Khanh T Nguyen
(74) *Attorney, Agent, or Firm* — Ohlandt, Greeley and Perle, L.L.P.

(57) ABSTRACT

A electrically conductive hydrogel composition includes: a polar polymer selected from the group consisting of polyvinyl alcohol, polyacrylic acid, polyethylene oxide, poly(2-acrylamido-2-methyl-1-propane sulfonic acid), and combinations thereof; a gelatin; a binding agent including tannic acid and dopamine; a hygroscopic agent including ethylene glycol; a strong electrolyte; and water. A self-healing electrically conductive hydrogel prepared from the electrically conductive hydrogel composition is also provided. A hydrogel-based triboelectric nanogenerator including a self-healing electrically conductive hydrogel film that is made from the self-healing electrically conductive hydrogel is also provided.

12 Claims, 7 Drawing Sheets

ELECTRICALLY CONDUCTIVE HYDROGEL COMPOSITION, SELF HEALING ELECTRICALLY CONDUCTIVE HYDROGEL PREPARED THEREFROM, AND HYDROGEL-BASED TRIBOELECTRIC NANOGENERATOR

CROSS-REFERENCE TO RELATED APPLICATION

This application claims priority to Taiwanese Invention patent application No. 112127169, filed on Jul. 20, 2023, and incorporated by reference herein in its entirety.

FIELD

The present disclosure relates to an electrically conductive hydrogel composition and a self-healing electrically conductive hydrogel prepared therefrom. The present disclosure also relates to a hydrogel-based triboelectric nanogenerator.

BACKGROUND

Hydrogels have an elastic structure made of polymer network and fluid, and are suitable to be used as a substrate for making a triboelectric nanogenerator, which is capable of converting a small amount of mechanical energy into electrical energy.

However, the output of electrical energy from the triboelectric nanogenerator could be greatly reduced due to physical damage thereto. In addition, the hydrogels present in the triboelectric nanogenerator may lose their mechanical properties and electrical conductivity due to water loss.

SUMMARY

Therefore, an object of the present disclosure is to provide an electrically conductive hydrogel composition, a self-healing electrically conductive hydrogel, and a hydrogel-based triboelectric nanogenerator that can alleviate at least one of the drawbacks of the prior art.

According to one aspect of the present disclosure, the electrically conductive hydrogel composition includes: a polar polymer selected from the group consisting of polyvinyl alcohol, polyacrylic acid, polyethylene oxide, poly(2-acrylamido-2-methyl-1-propane sulfonic acid), and combinations thereof; a gelatin; a binding agent including tannic acid and dopamine; a hygroscopic agent including ethylene glycol; a strong electrolyte; and water.

According to another aspect of the present disclosure, the self-healing electrically conductive hydrogel is prepared from the aforesaid electrically conductive hydrogel composition.

According to still another aspect of the present disclosure, the hydrogel-based triboelectric nanogenerator includes a self-healing electrically conductive hydrogel film that is made from the aforesaid self-healing electrically conductive hydrogel.

BRIEF DESCRIPTION OF THE DRAWINGS

Other features and advantages of the present disclosure will become apparent in the following detailed description of the embodiment(s) with reference to the accompanying drawings. It is noted that various features may not be drawn to scale.

DETAILED DESCRIPTION

Before the present disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

For the purpose of this specification, it will be clearly understood that the word "comprising" means "including but not limited to", and that the word "comprises" has a corresponding meaning.

Unless otherwise defined, all technical and scientific terms used herein have the meaning commonly understood by a person skilled in the art to which the present disclosure belongs. One skilled in the art will recognize many methods and materials similar or equivalent to those described herein, which could be used in the practice of the present disclosure. Indeed, the present disclosure is in no way limited to the methods and materials described.

The present invention provides an electrically conductive hydrogel composition which includes a polar polymer, a gelatin, a binding agent including tannic acid and dopamine, a hygroscopic agent including ethylene glycol, a strong electrolyte, and water. The polar polymer is selected from the group consisting of polyvinyl alcohol, polyacrylic acid, polyethylene oxide, poly(2-acrylamido-2-methyl-1-propane sulfonic acid), and combinations thereof.

In certain embodiments, the electrically conductive hydrogel composition further includes carbon nanoparticles. In certain embodiments, the carbon nanoparticles are present in an amount ranging from 0.036 wt % to 0.044 wt % based on 100 wt % of the electrically conductive hydrogel composition.

In certain embodiments, the strong electrolyte is selected from the group consisting of sodium chloride, sodium nitrate, lithium chloride, lithium bis(trifluoromethanesulfonyl) imide, iron (III) chloride, and combinations thereof.

In certain embodiments, the polar polymer is polyvinyl alcohol that is present in an amount ranging from 22.3 wt % to 27.3 wt % based on 100 wt % of the electrically conductive hydrogel composition.

In certain embodiments, a weight ratio of water to ethylene glycol in the electrically conductive hydrogel composition ranges from 6:1 to 11:1.

In certain embodiments, the gelatin is present in an amount ranging from 0.09 wt % to 0.15 wt % based on 100 wt % of the electrically conductive hydrogel composition.

In certain embodiments, the tannic acid is present in an amount ranging from 0.31 wt % to 0.39 wt % based on 100 wt % of the electrically conductive hydrogel composition.

In certain embodiments, the dopamine is present in an amount ranging from 0.09 wt % to 0.15 wt % based on 100 wt % of the electrically conductive hydrogel composition.

In certain embodiments, the strong electrolyte is present in an amount ranging from 3.1 wt % to 3.9 wt % based on 100 wt % of the electrically conductive hydrogel composition.

The present disclosure also provides a self-healing electrically conductive hydrogel prepared from the aforesaid electrically conductive hydrogel composition.

Figure 1:
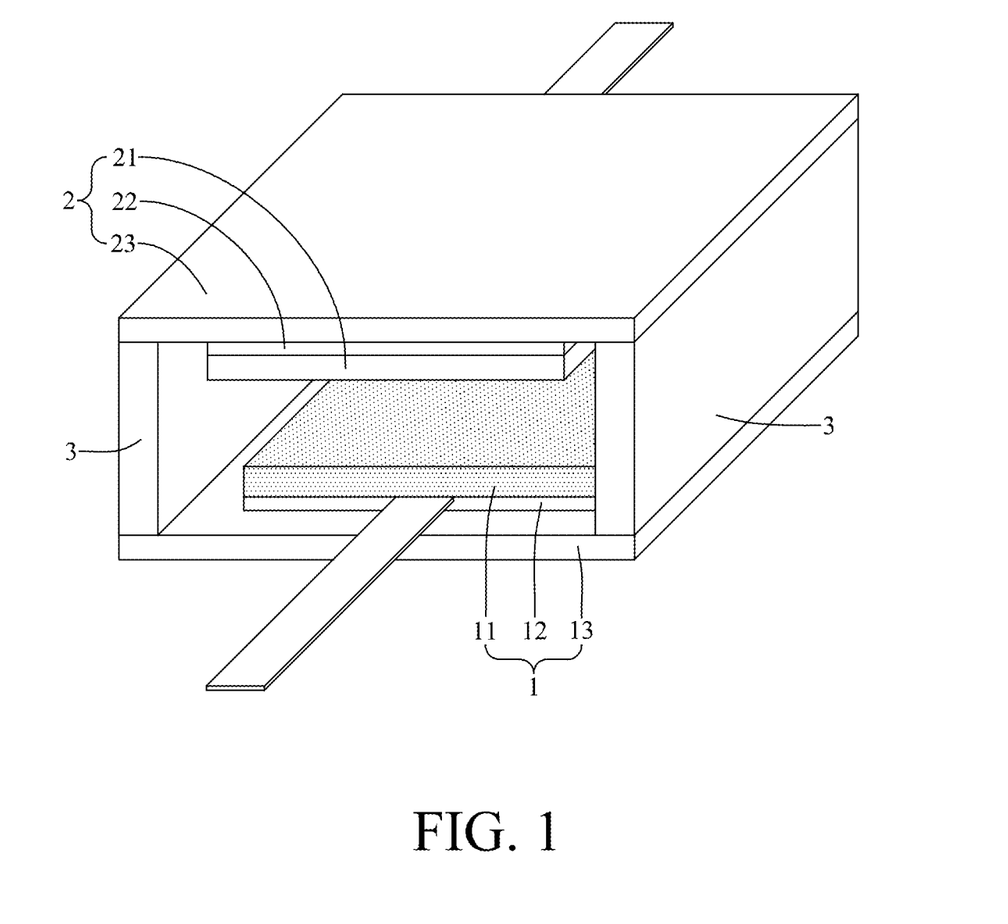
FIG. 1 is a perspective schematic view illustrating a hydrogel-based triboelectric nanogenerator which includes an electrically conductive hydrogel film capable of self-healing and which is made from an embodiment of an electrically conductive hydrogel composition according to the present disclosure.

Referring to FIG. 1, the present disclosure also provides a hydrogel-based triboelectric nanogenerator including a self-healing electrically conductive hydrogel film 11 that is made from the aforesaid self-healing electrically conductive hydrogel.

The present disclosure will be described by way of the following examples. However, it should be understood that the following examples are intended solely for the purpose of illustration and should not be construed as limiting the present disclosure in practice.

Preparation of Electrically Conductive Hydrogel Composition

Example 1 (EX1)

Polyvinyl alcohol (a type of polar polymer, Manufacturer: Sigma-Aldrich; CAS no.: 9002-89-5), gelatin (Manufacturer: Sigma-Aldrich; CAS no.: 9000-70-8), tannic acid (a type of binding agent, Manufacturer: Sigma-Aldrich; CAS no.: 1401-55-4), dopamine (another type of binding agent, Manufacturer: Sigma-Aldrich; Catalogue no.: 62-31-7), ethylene glycol (a type of hygroscopic agent, Manufacturer: Emperor Chemical Co., Ltd.), sodium chloride (a type of strong electrolyte, Manufacturer: Honeywell Research Chemicals; CAS no.: 7647-14-5), carbon nanoparticles (average particle size of 17 nm), and water were evenly mixed and heated at 95° C. for 60 minutes, thereby obtaining an electrically conductive hydrogel composition of EX1. Please note that the carbon nanoparticles were prepared by burning pistachio shells (source: pistachios purchased from Lian Hwa Foods Corporation) at a temperature of 900° C. for 15 minutes, followed by dispersion in water and then filtration using a filter membrane having a pore size of 8 µm.

Examples 2 and 3 (EX2 and EX3)

The procedures for preparing the electrically conductive hydrogel compositions of EX2 and EX3 were similar to those of EX1, except for the differences in the amounts of the ingredients thereof.

Comparative Examples 1 to 4 (CE1 to CE4)

The procedures for preparing the electrically conductive hydrogel compositions of CE1 to CE4 were similar to those of EX1, except that in CE1 to CE4, certain ingredients were omitted and the amounts of the ingredients differ from those of EX1.

The type and amount of each ingredient of the electrically conductive hydrogel compositions of EX1 to EX3 and CE1 to CE4 were shown in Table 1 below.

TABLE 1

| Ingredients (amounts) | | Electrically conductive hydrogel composition | | | | | | |
|---|---|---|---|---|---|---|---|---|
| | | EX1 | EX2 | EX3 | CE1 | CE2 | CE3 | CE4 |
| Polar polymer | Polyvinyl alcohol (wt %) | 24.8 | 24.8 | 24.8 | — | — | 24.8 | 24.8 |
| Gelatin (wt %) | | 0.1 | 0.1 | 0.1 | 1.94 | 0.97 | 0.15 | 0.15 |
| Binding agent | Tannic acid (wt %) | 0.35 | 0.35 | 0.35 | 0.97 | 0.97 | 0.35 | 0.35 |
| | Dopamine (wt %) | 0.1 | 0.15 | 0.15 | — | 0.97 | 0.15 | 0.15 |
| Hygroscopic agent | Ethylene glycol (wt %) | 7.81 | 6.25 | 9.36 | — | — | — | — |
| Strong electrolyte | Sodium chloride (wt %) | 3.5 | 3.5 | 3.5 | — | — | — | 3.5 |
| Carbon nanoparticles (wt %) | | 0.04 | 0.04 | 0.04 | — | — | 7.09 | — |
| Water (wt %) | | 63.3 | 64.81 | 61.7 | 97.09 | 97.09 | 67.46 | 71.05 |

"—": not added

Application of Electrically Conductive Hydrogel Compositions

Application Example 1 (AE1)

FIG. 1 showed an exemplified hydrogel-based triboelectric nanogenerator which includes an electrically conductive hydrogel film 11 capable of self-healing and which was prepared using the aforesaid electrically conductive hydrogel composition. First, approximately 3 ml of the electrically conductive hydrogel composition of EX1 was introduced into a mold (dimension: 4 cm×4 cm×2 cm), and then subjected to freeze-molding at a temperature of −15° C. for 1 hour to form an electrically conductive hydrogel, followed by thawing at room temperature for 3 hours, so as to obtain the electrically conductive hydrogel film 11. Next, the electrically conductive hydrogel film 11 were bonded to a first aluminum electrode 12, and then the electrically conductive hydrogel film 11 bonded to a first aluminum electrode 12 in such order were fixedly positioned on a top surface of a first polyethylene terephthalate film 13 using a polyimide tape, thereby obtaining a first friction laminate 1. At the same time, a polyimide film 21 was bonded to a second aluminum electrode 22, and then the second aluminum electrode 22 bonded to the polyimide film 21 in such order were fixedly positioned on a bottom surface of a second polyethylene terephthalate film 23 using a polyimide tape, thereby obtaining a second friction laminate 2. Thereafter, the first polyethylene terephthalate film 13 was connected to the second terephthalate film 23 by using a VHB™ tape 3, such that two side surfaces opposite to each other of the first polyethylene terephthalate film 13 were respectively connected to corresponding two side surfaces opposite to each other of the second polyethylene terephthalate film 23 with the VHB™ tape 3 being fixedly positioned therebetween, and such that the electrically conductive hydrogel film 11 and the polyimide film 21 face each other with a gap formed therebetween, thereby obtaining a hydrogel-based triboelectric nanogenerator of AE1 (see FIG. 1).

Application Examples 2 and 3 (AE2 and AE3)

The procedures and conditions for preparing the hydrogel-based triboelectric nanogenerators of AE2 and AE3 were similar to those of AE1, except for the differences in the source of the electrically conductive hydrogel films 11, i.e., the electrically conductive hydrogel films 11 of the hydrogel-based triboelectric nanogenerators of AE2 and AE3 were prepared using the electrically conductive hydrogel compositions of EX2 and EX3, respectively.

Comparative Application Examples 1 and 2 (CAE1 and CAE2)

Each of the electrically conductive hydrogel compositions of CE1 and CE2, after being subjected to the aforesaid freezing and thawing steps, was still present in a liquid state, and thus, cannot be molded to form an electrically conductive hydrogel film 11. As such, hydrogel-based triboelectric nanogenerators of CAE1 and CAE2 cannot be manufactured.

Comparative Application Examples 3 and 4 (CAE3 and CAE4)

The procedures and conditions for preparing the hydrogel-based triboelectric nanogenerators of CAE3 and CAE4 were similar to those of AE1, except for the differences in the source of the electrically conductive hydrogel films 11, i.e., the electrically conductive hydrogel films 11 of the hydrogel-based triboelectric nanogenerators of CAE3 and CAE4 were prepared using the electrically conductive hydrogel compositions of CE3 and CE4, respectively.

It should be noted that the electrically conductive hydrogel films 11 of the hydrogel-based triboelectric nanogenerators of CAE3 and CAE4, which were respectively made from the electrically conductive hydrogel compositions of CE3 and CE4, were too sticky, causing difficulty to smoothly separate the first friction laminate 1 from the second friction laminate 2 in each of the hydrogel-based triboelectric nanogenerators of CAE3 and CAE4 during operation thereof, and thus, the hydrogel-based triboelectric nanogenerators of CAE3 and CAE4 were unable to generate current by electrostatic induction.

Property Evaluation

1. Electrical Output

A respective one of the hydrogel-based triboelectric nanogenerators of AE1 to AE3 was subjected to measurement of electrical output so as to evaluate self-healing ability of the electrically conductive hydrogel film 11 thereof. First, an output voltage and an output current density of the respective one of the hydrogel-based triboelectric nanogenerators of AE1 to AE3 were measured using a charge amplifier (Manufacturer: Sinocera Piezotronics, Inc.; Model no.: YE5852), a signal generator (Manufacturer: Sinocera Piezotronics, Inc.; Model no.: YE1311), a power amplifier (Manufacturer: Sinocera Piezotronics, Inc.; Model no.: YE587), and an electrodynamic shaker (Manufacturer: Sinocera Piezotronics, Inc.; Model no.: JZK series) under an applied compressive force of 40 N and a frequency of 2 Hz for 20 seconds. An average output voltage generated by each of the hydrogel-based triboelectric nanogenerators of AE1 to AE3, before damage to the electrically conductive hydrogel film 11, are shown in Table 2 below.

Next, the electrically conductive hydrogel film 11 in the respective one of the hydrogel-based triboelectric nanogenerators of AE1 to AE3 was subjected to damage by cutting into two halves, and then the two halves of the electrically conductive hydrogel film 11 were placed in direct contact with each other for 1 hour to allow self-healing. Thereafter, the hydrogel-based triboelectric nanogenerators of AE1 to AE3 were subjected to measurement of output voltage and an output current density under an applied compressive force of 40 N and a frequency of 2 Hz for 20 seconds. An average output voltage and an average output current density generated by each of the hydrogel-based triboelectric nanogenerators of AE1 to AE3, after damage and self-healing of the electrically conductive hydrogel film 11, are shown in Table 2 below.

Figure 2:
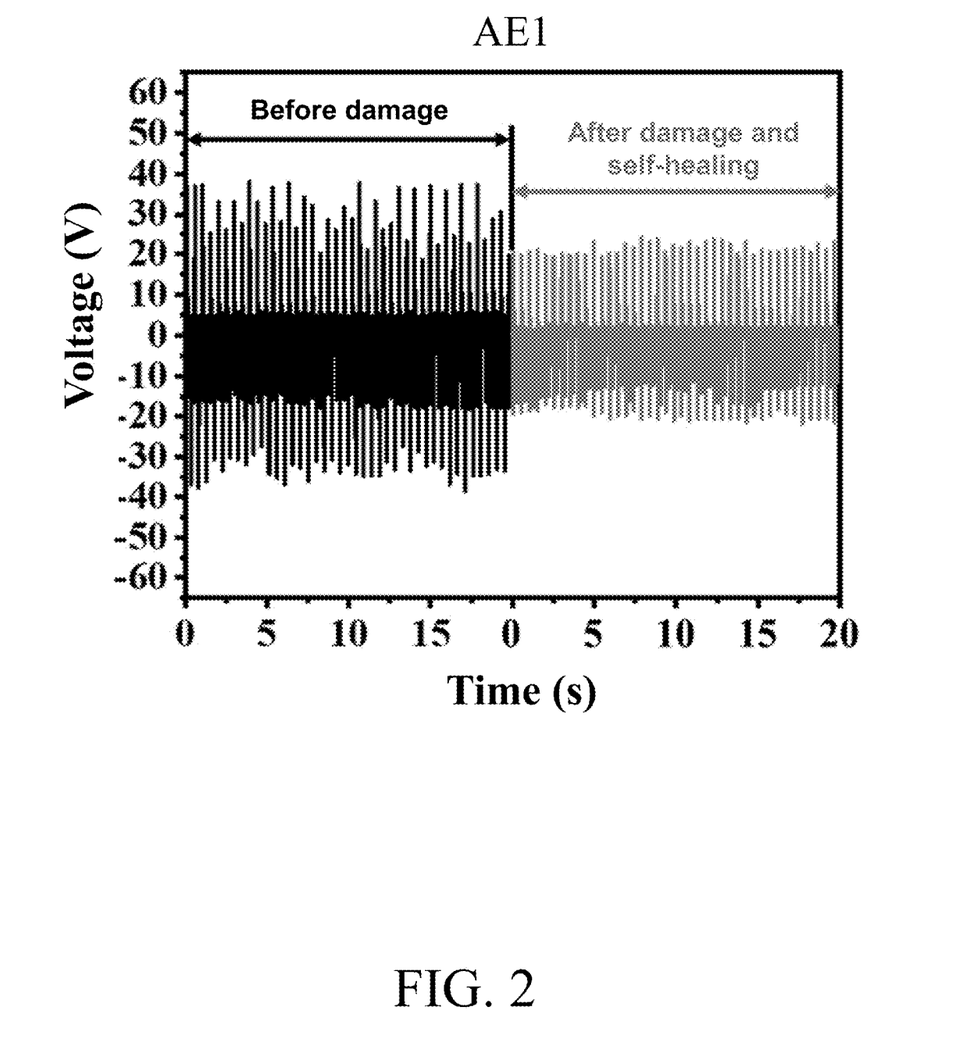
FIG. 2 is a graph illustrating the output voltage versus time measured in a hydrogel-based triboelectric nanogenerator of Application Example 1 (AE1) before an electrically conductive hydrogel film was damaged (left half), and after the electrically conductive hydrogel film was damaged and self-healed (right half).
Figure 3:
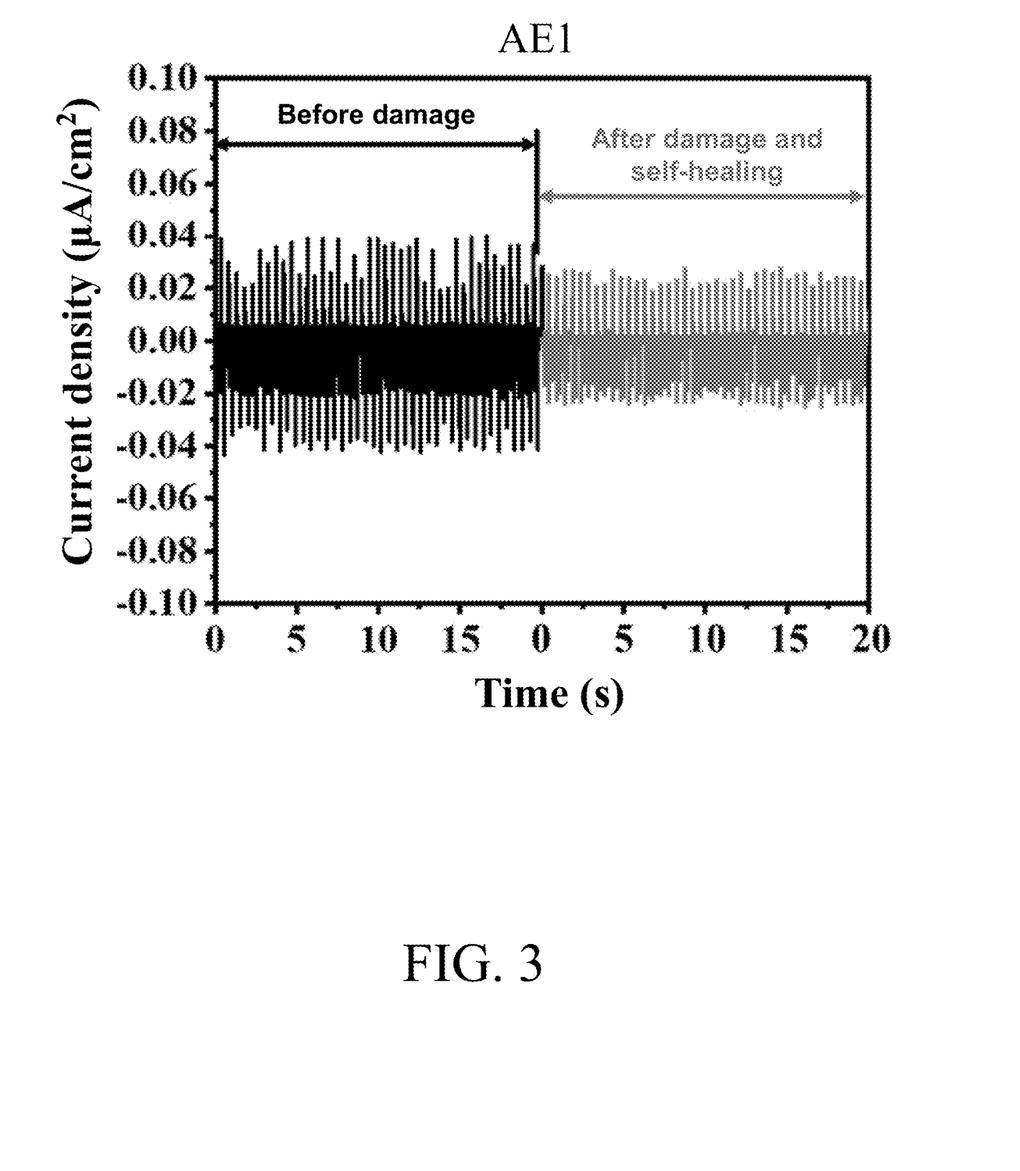
FIG. 3 is graph showing the output current density versus time measured in the hydrogel-based triboelectric nanogenerator of AE1 before the electrically conductive hydrogel film was damaged (left half), and after the electrically conductive hydrogel film was damaged and self-healed (right half).
Figure 4:
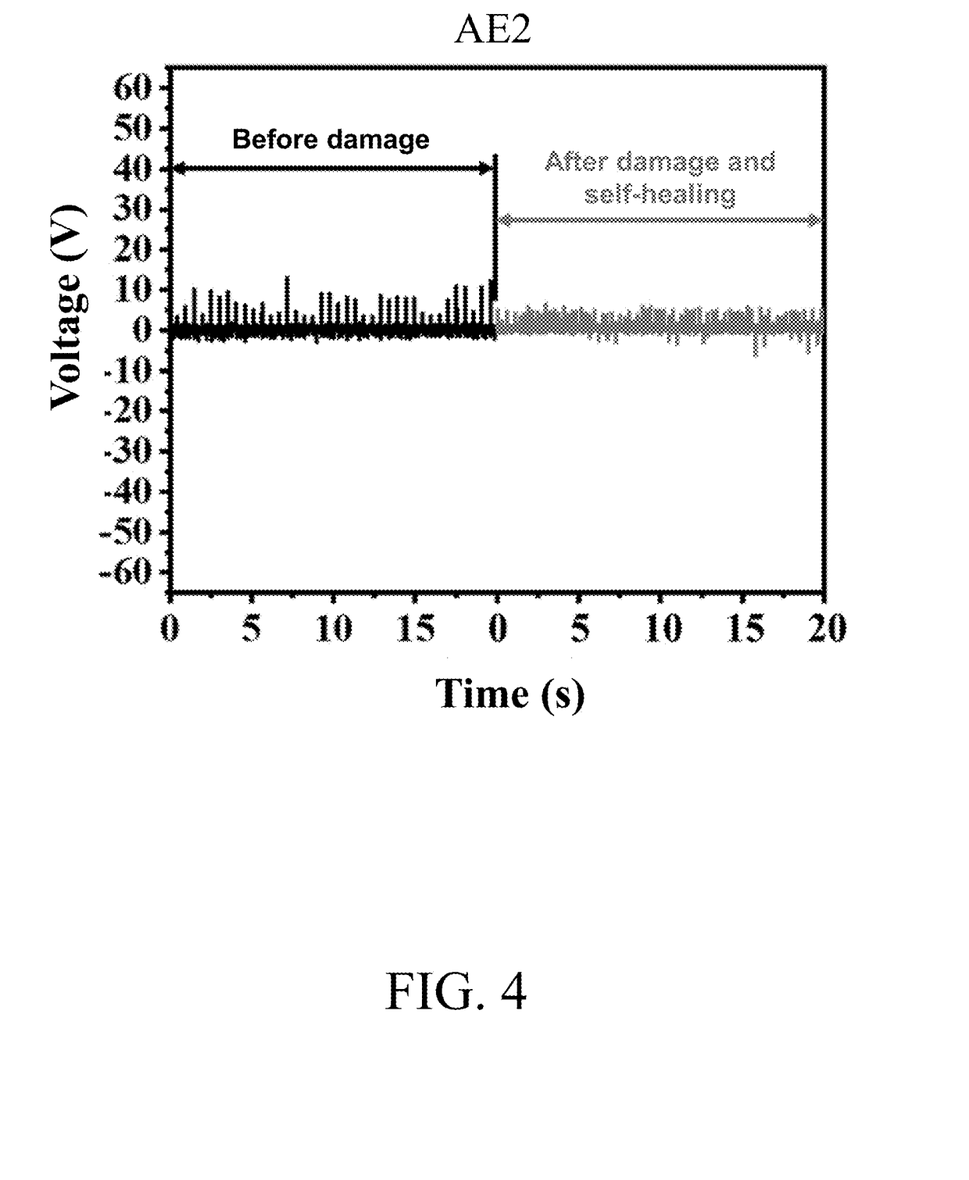
FIG. 4 is a graph showing the output voltage versus time measured in the hydrogel-based triboelectric nanogenerator of Application Example 2 (AE2) before the electrically conductive hydrogel film was damaged (left half), and after the electrically conductive hydrogel film was damaged and self-healed (right half).
Figure 5:
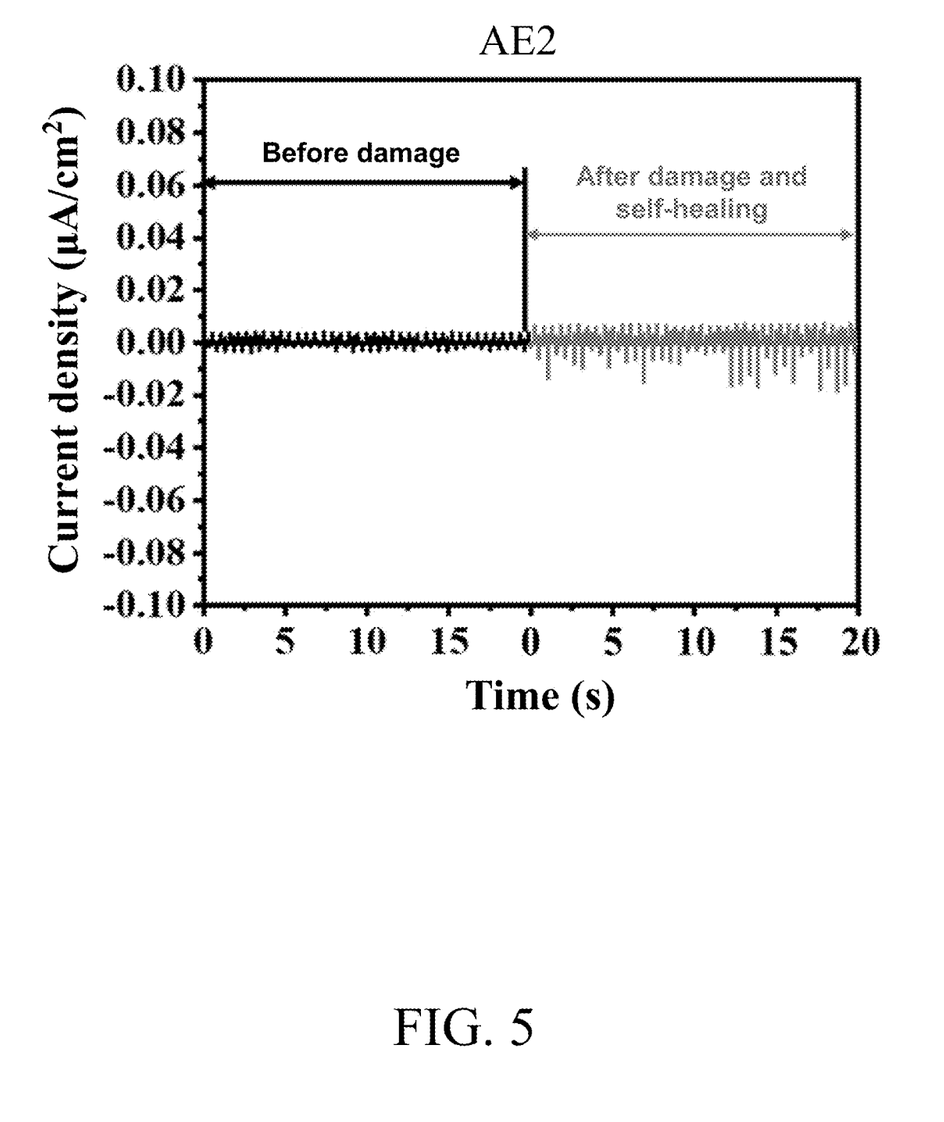
FIG. 5 is a graph showing the output current density versus time measured in the hydrogel-based triboelectric nanogenerator of AE2 before the electrically conductive hydrogel film was damaged (left half), and after the electrically conductive hydrogel film was damaged and self-healed (right half).
Figure 6:
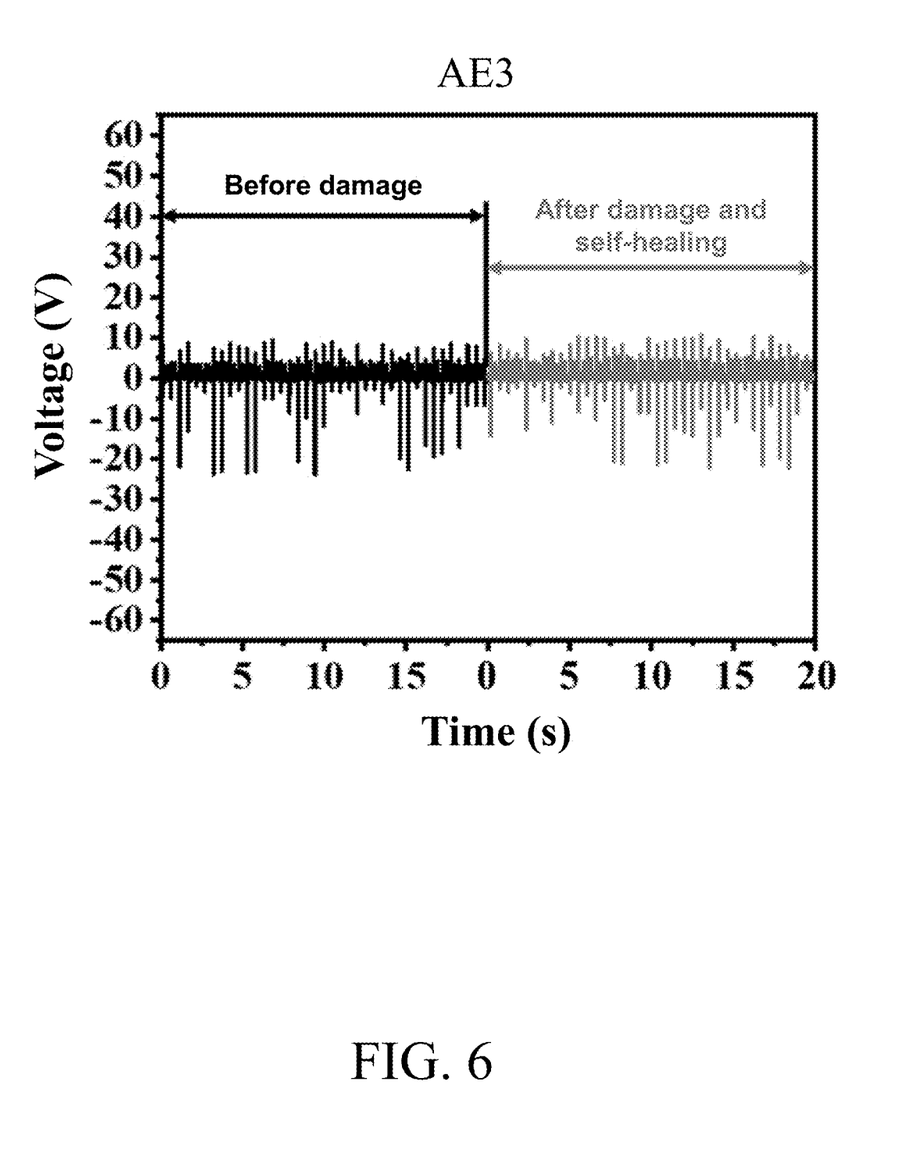
FIG. 6 is a graph showing the output voltage versus time measured in the hydrogel-based triboelectric nanogenerator of Application Example 3 (AE3) before the electrically conductive hydrogel film was damaged (left half), and after the electrically conductive hydrogel film was damaged and self-healed (right half).
Figure 7:
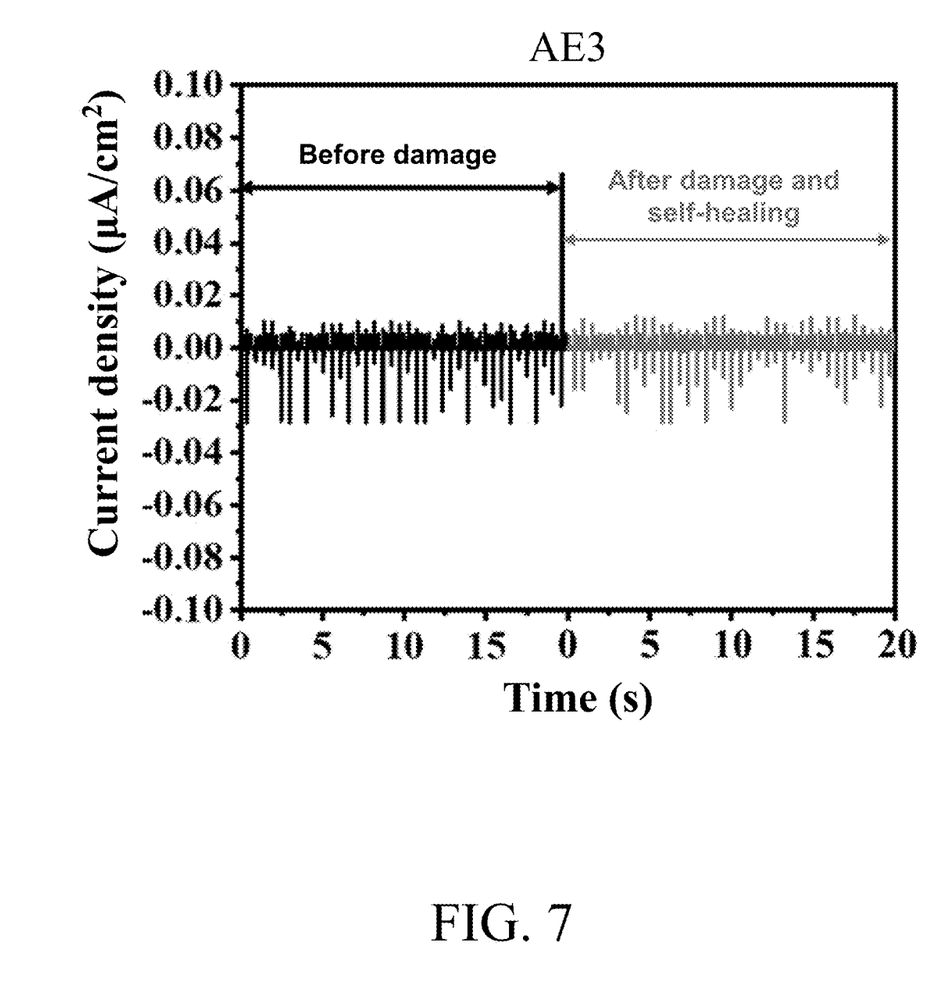
FIG. 7 is a graph showing the output current density versus time measured in the hydrogel-based triboelectric nanogenerator of AE3 before the electrically conductive hydrogel film was damaged (left half), and after the electrically conductive hydrogel film was damaged and self-healed (right half).

For the hydrogel-based triboelectric nanogenerator of AE1, the measured output voltage versus time and the measured output current density versus time were shown in FIGS. 2 and 3, respectively. For the hydrogel-based triboelectric nanogenerator of AE2, the measured output voltage versus time and the measured output current density versus time were shown in FIGS. 4 and 5, respectively. For the hydrogel-based triboelectric nanogenerator of AE3, the measured output voltage versus time and the measured output current density versus time were shown in FIGS. 6 and 7, respectively.

TABLE 2

| Hydrogel-based triboelectric nanogenerator | Before damage of electrically conductive hydrogel film | | After damage and self-healing of electrically conductive hydrogel film | |
|---|---|---|---|---|
| | Average output voltage (V) | Average output current density (µA/cm$^2$) | Average output voltage (V) | Average output current density (µA/cm$^2$) |
| AE1 | 70 | 0.07 | 40 | 0.04 |
| AE2 | 10 | 0.01 | 5 | 0.015 |
| AE3 | 30 | 0.03 | 23 | 0.025 |

As shown in Table 2, the hydrogel-based triboelectric nanogenerators of AE1 to AE3, after damage to the respective one of the electrically conductive hydrogel films 11, were still capable of restoring approximately 50% to 77% of the output voltage and approximately 57% to 150% of the output current density, indicating that the electrically conductive hydrogel compositions of EX1 to EX3 confer a high level of self-healing ability to the electrically conductive hydrogel prepared therefrom, such that the hydrogel-based triboelectric nanogenerators of AE1 to AE3 including the electrically conductive hydrogel films 11 made from the self-healing electrically conductive hydrogel had high capability to restore the function of outputting electrical energy after self-healing of the electrically conductive hydrogel films 11.

In summary, by inclusion of the polar polymer, the gelatin, the binding agent, the hygroscopic agent, and the strong electrolyte, the electrically conductive hydrogel composition of the present disclosure can be used to prepare a self-healing electrically conductive hydrogel, which can be molded to form a self-healing electrically conductive hydrogel film to be applied in a hydrogel-based triboelectric nanogenerator, such that the hydrogel-based triboelectric nanogenerator is capable of outputting electrical energy after the electrically conductive hydrogel film is damaged and self-healed.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. An electrically conductive hydrogel composition, comprising:
   a polar polymer selected from the group consisting of polyvinyl alcohol, polyacrylic acid, polyethylene oxide, poly(2-acrylamido-2-methyl-1-propane sulfonic acid), and combinations thereof;
   a gelatin;
   a binding agent including tannic acid and dopamine;
   a hygroscopic agent including ethylene glycol;
   an electrolyte; and
   water.

2. The electrically conductive hydrogel composition as claimed in claim 1, further comprising, carbon nanoparticles.

3. The electrically conductive hydrogel composition as claimed in claim 2, wherein the polar polymer is polyvinyl alcohol that is present in an amount ranging from 22.3 wt % to 27.3 wt % based on 100 wt % of the electrically conductive hydrogel composition.

4. The electrically conductive hydrogel composition as claimed in claim 2, wherein the gelatin is present in an amount ranging from 0.09 wt % to 0.15 wt % based on 100 wt % of the electrically conductive hydrogel composition.

5. The electrically conductive hydrogel composition as claimed in claim 2, wherein the tannic acid is present in an amount ranging from 0.31 wt % to 0.39 wt % based on 100 wt % of the electrically conductive hydrogel composition.

6. The electrically conductive hydrogel composition as claimed in claim 2, wherein the dopamine is present in an amount ranging from 0.09 wt % to 0.15 wt % based on 100 wt % of the electrically conductive hydrogel composition.

7. The electrically conductive hydrogel composition as claimed in claim 2, wherein the electrolyte is present in an amount ranging from 3.1 wt % to 3.9 wt % based on 100 wt % of the electrically conductive hydrogel composition.

8. The electrically conductive hydrogel composition as claimed in claim 2, wherein the carbon nanoparticles are present in an amount ranging from 0.036 wt % to 0.044 wt % based on 100 wt % of the electrically conductive hydrogel composition.

9. The electrically conductive hydrogel composition as claimed in claim 1, wherein the electrolyte is selected from the group consisting of sodium chloride, sodium nitrate, lithium chloride, lithium bis(trifluoromethanesulfonyl) imide, iron (III) chloride, and combinations thereof.

10. The electrically conductive hydrogel composition as claimed in claim 1, wherein a weight ratio of water to ethylene glycol ranges from 6:1 to 11:1.

11. A self-healing electrically conductive hydrogel, which is prepared from an electrically conductive hydrogel composition as claimed in claim 1.

12. A hydrogel-based triboelectric nanogenerator, comprising a self-healing electrically conductive hydrogel film that is made from a self-healing electrically conductive hydrogel as claimed in claim 11.

* * * * *